United States Patent [19]
Berke

[11] Patent Number: 6,015,111
[45] Date of Patent: Jan. 18, 2000

[54] FISHING LINE EXCHANGER, STRUCTURE AND METHOD

[76] Inventor: Joseph J. Berke, 3248 Interlaken, West Bloomfield, Mich. 48323

[21] Appl. No.: 09/065,699

[22] Filed: Apr. 24, 1998

[51] Int. Cl.[7] .................. A01K 89/017; B65H 75/14; B65H 75/22; B65H 75/30
[52] U.S. Cl. .............. 242/394; 242/390.8; 242/250; 242/323; 242/902
[58] Field of Search .................. 242/902, 394, 242/405, 405.3, 250, 323, 390.8, 390.9, 608.5

[56] References Cited

U.S. PATENT DOCUMENTS

| | | | |
|---|---|---|---|
| 3,126,166 | 3/1964 | Weinberg | 242/323 |
| 3,216,145 | 11/1965 | Aunspaugh | 242/323 |
| 3,438,592 | 4/1969 | Posso | 242/608.5 |
| 4,007,886 | 2/1977 | Kaminstein | 242/902 |
| 4,196,864 | 4/1980 | Cole | 242/608.5 |
| 4,588,139 | 5/1986 | Lines | 242/902 |
| 4,951,890 | 8/1990 | Sossamon | 242/902 |
| 4,962,901 | 10/1990 | Shirley et al. | 242/323 |
| 5,277,350 | 1/1994 | Thornbury | 242/390.8 |

*Primary Examiner*—John M. Jillions

[57] ABSTRACT

A tool and a method for the rapid and easy exchange of fishing line of a fishing reel includes a spool having two flanges. A first flange of the spool is preferably detachable for easy and efficient removal of used or damaged line from the spool. The tool further includes the ability to be used with a manual means for turning the spool. The manual version can be operated using brace and bit. In the preferred embodiment a motor is provided for driving the reel for rapid uptake and storage of a fishing line, the driving means preferably includes pair of spaced apart openings located on one of the flanges of the spool and the openings are preferably aligned to receive first and second handle portions of a handle of the fishing reel. A storage rack holds several exchangeable spools for different varieties (i.e., weight, color or length) of usable fishing lines. A method of using the exchanger and the storage rack is also described in detail.

18 Claims, 3 Drawing Sheets

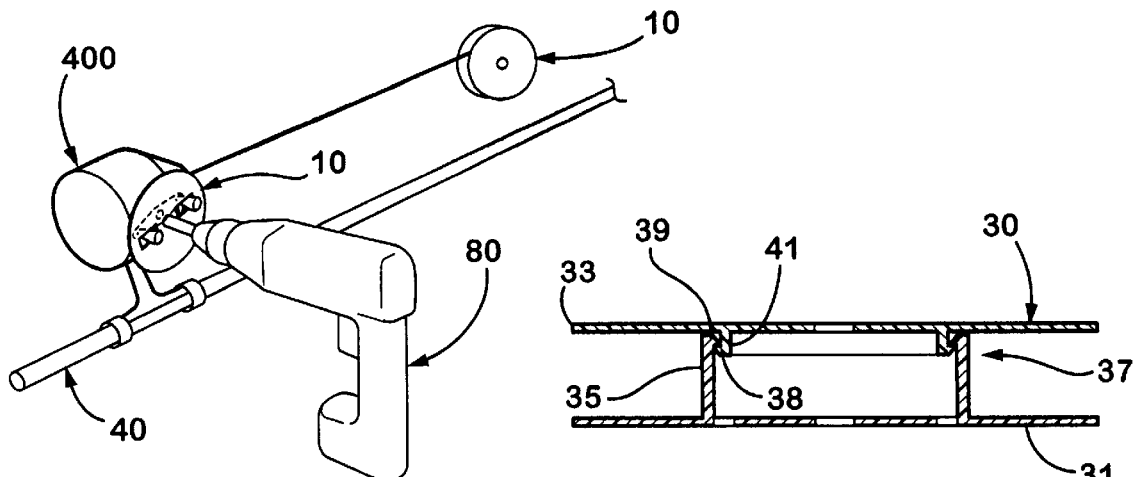
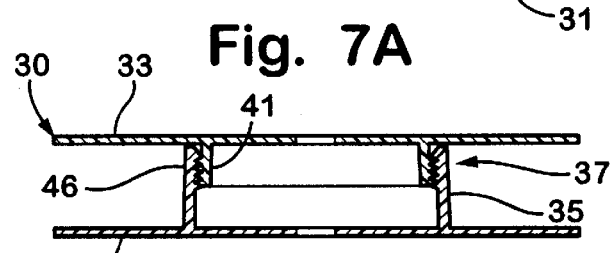
Fig. 3
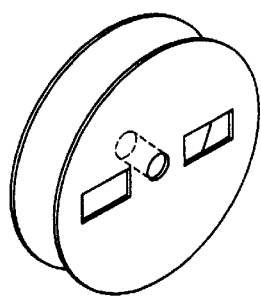
Fig. 4
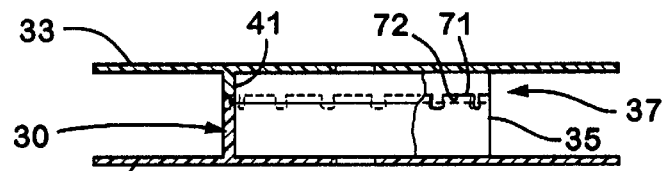
Fig. 7A
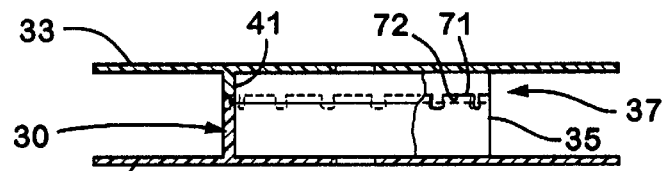
Fig. 7B
Fig. 7C
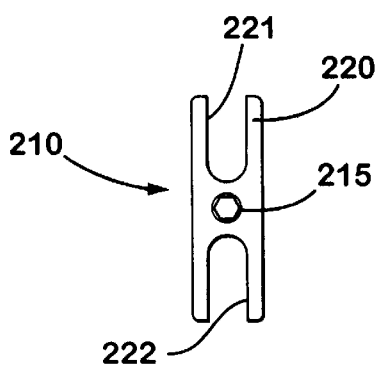
Fig. 8
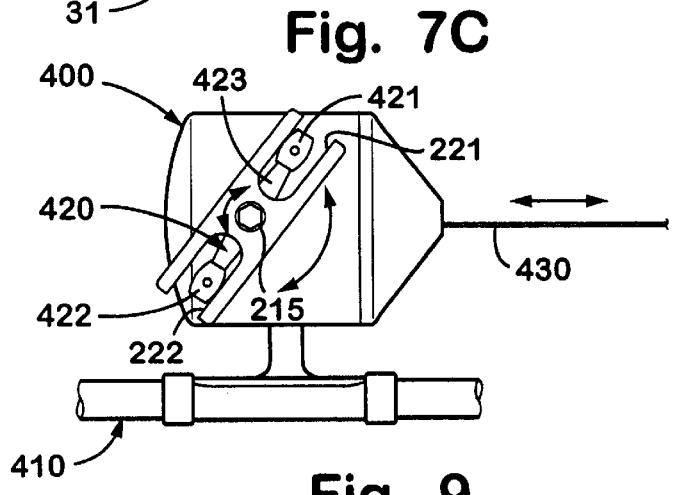
Fig. 9

FISHING LINE EXCHANGER, STRUCTURE AND METHOD

BACKGROUND OF THE INVENTION

1. Field of the Invention

The present invention generally relates to a tool and a method for using the tool to quickly and easily change the fishing line on a fishing reel of a fishing rod. More specifically, the present invention relates to a tool capable of use with many different types of fishing reel handles such that it will take off the fishing line from the reel, which can then be stored or thrown away, and the tool will then drive the handle of the fishing reel to install a new fishing line onto the reel from a tool according to the present invention.

2. Description of the Prior Art

The sport of fishing and the required equipment such as fishing rods and reels have been very well known and utilized for many years. Presently, both amateur and professional sport fishing have become increasingly popular. However, despite the popularity of the sport of fishing there still remains several very significant problems associated with the fishing line of a fishing rod and reel becoming used and old as well as with removing and exchanging the fishing line of the reel.

The process of exchanging the fishing line normally requires the person or angler to remove the installed line from the reel by pulling the line out by hand; selecting a new line to install on the reel (which may be of a different size, weight or color); attaching the new line to the reel and then hand winding the new line from a standard spool by hand turning the fishing reel handle. This is clearly a cumbersome and fatiguing process.

There can be many reasons for exchanging the line on a reel such as the installed line has become overused, damaged, broken and too short, or the line on the reel is the wrong size, color or strength. Because it has been difficult or inconvenient to quickly exchange the line there is a tendency to make due and continue using the line already installed on the device. The result may disappoint the angler in not catching fish or in losing a fish while it is "on line." These situations too frequently result in the many vivid fishing stories about "the huge fish that got away" with the "hook, line and sinker" to the chagrin of many an angler.

Several attempts have been made in the prior art to attempt to automate the process of changing the fishing line on the fishing reel. However, these prior art attempts have significant drawbacks and have not fully addressed the problems associated with the process of changing the line of a fishing reel.

For example, U.S. Pat. No. 3,126,166, to Weinberg, discloses a simple electric motor drive intended to use only one hand to operate the motor and the other hand to hold the fishing rod. The electric motor 10 is designed to engage the handle 6 of the reel 5 using a flange 20 (shown as a disc) and a pair of pins 18 aligned with a pair of openings aligned along the handle or lever 6 of the reel 5. The Weinberg reference alternatively teaches that it is preferable to use the openings 19 and the pins 18, it is possible to position the unit with the pins 18 over opposite edges of the crank lever or handle 6. Thus, the Weinberg reference teaches it is only intended for driving the reel and not for changing the line of the reel, however, it could be used for this purpose but with many drawbacks. Further, the Weinberg reference teaches to modify the handle 6 of the reel 5 to provide a motor only for driving the reel, in particular for deep sea fishing.

Similar to the Weinberg reference, U.S. Pat. No. 4,962,901, to Shirley et al., discloses and teaches a drive member connected to a crank shaft of the fishing reel and having a shank extension for connecting the drive member to a motor such as cordless drill or motorized screw driver. In particular, Shirley et al. teach that the drive member having a plurality recesses engage a lock screw mounted to the crank shaft of the reel. While this will drive the fishing reel, it results in the need to use a particular method because the Shirley et al. device contacts the reel at a single contact point having an axis directly aligned with the crank shaft of the reel.

Thus, there remains a significant need for a fishing line exchanging device and system that is easy and efficient in operation, inexpensive and simple to manufacture and is capable of inexpensively exchanging and storing many different sizes and types of fishing lines.

SUMMARY OF THE INVENTION

The present invention pertains generally to a device or tool for changing the fishing line of a fishing reel. Additionally, the tool of the present invention is capable of driving nearly any type of fishing reel handle and simultaneously dispensing or taking up the fishing line from and to the fishing reel for exchanging, i.e., removing or installing a fishing line. In many instances it becomes desirable and even necessary to exchange, remove, and/or install the fishing line on a fishing reel. The reasons for changing the fishing line include but are not limited to having a broken, frayed or thin line; and having the wrong color, weight or type of fishing line for a particular type of fishing.

The device or tool includes a drive or spool member having a pair of spaced apart flange members, preferably having a disc shape, defining both the tool for driving the reel handle and a spool for holding and/or dispensing the fishing line. The spool preferably includes a central cylinder and a pair of spaced apart flange members which may also be referred to as heads or rims of the spool.

The tool further includes a means for driving the handle of the reel wherein the driving means are integrally formed with the spool and in the preferred embodiment, the driving means is unitarily formed with the first flange member such that the first flange member of the spool includes a pair of openings therein which are appropriately located on the flange member to align with the knobs or posts of the handle of the fishing reel.

In another embodiment, the device according to the present invention includes a spool having a centrally located bayonet-type, male, locking device on one side of the spool and a drive member includes a bayonet-type, female, locking device for connection with the spool and including a tool bit connection on the opposite side of the drive member such that the spool is removably attachable with the drive member.

In yet another embodiment of the present invention, the spool is designed to have a flange member removable from the spool. The flange member is designed to be removably connected to the spool through the use of a bayonet-type lock, a press-fit or taper-fit interference or any other known means for connecting the disc-shaped flange with the spool. Thus, when it is desirable to empty a fishing line from a spool, a person need only remove the range from the spool and then laterally remove the fishing line en masse from the central cylinder The device of the present embodiment operates according to a unique method wherein the fishing line on a fishing reel is first removed by attaching the free end of the line to the spool connected to the drive member and the drive member has its tool bit end connected to a drill. The drill is activated to spool the line on the spool and remove it from the reel. Next, the spool of the device is removed from the drive member by disengaging the male member from the female member of the locking device.

Next, a second spool member having a different fishing line wound thereon is set on a spindle to allow it to freely spin. The free end of the fishing line of the second spool member is connected to the empty fishing reel of the fishing rod and then the drive member is positioned on the handle of the reel and the drill motor is started to cause the reel to quickly take up the fishing line. Thus, a different fishing line is installed on the reel and the old fishing line is on a spool and can be stored. The present invention further includes a storage rack designed to hold the spools according to the present invention.

Additionally, the present invention can be incorporated into a spool holding a new fishing line that can be commercially sold including the present invention and will then function according to the method of the present invention to exchange a fishing line on a fishing reel. Further details and descriptions of the present invention will further make clear the present invention and its different embodiments after the following brief description of the drawings.

Accordingly, it is an object of the present invention to provide a device and system for quickly removing a fishing line from a reel of a fishing rod and quickly installing a new fishing line on the reel of the fishing rod.

It is a further object of the present invention to provide a fishing line changing device that is capable of removing and storing a fishing line and taking a fishing line from storage on a separate storage reel that can be quickly installed on the reel of the fishing rod using the device of the present invention to automatically drive the handle of the reel to take up the fishing line from the storage reel.

It is a further object of the present invention to provide a fishing line changing device or tool that is quick and efficient in exchanging a fishing line of a fishing reel once the old fishing line becomes deteriorated, broken or used up or when the type of line on the reel is undesirable for a particular fishing situation.

It is yet a further object of the present invention to provide a tool or device useful in exchanging the fishing line of a fishing reel wherein a traditional fishing line spool on which fishing line has been commonly sold can be modified to include the device of the present invention such that a significant cost savings can be achieved compared to prior art fishing line exchanging devices and such that the storage device and method are according to the present invention.

Other objects and advantages of the present invention will become apparent in the following detailed description of the invention with reference being made to the above drawings.

BRIEF DESCRIPTION OF THE DRAWINGS

FIG. 3 is a perspective view illustrating the device of FIGS. 1 and 2 according to the present invention attached to a handle of a reel on a fishing rod;

FIG. 4 is a perspective view of a device according to an alternative embodiment according to the present invention;

FIGS. 7A through 7C are partial break-away side views of differing fishing line exchanging devices according to the present invention showing alternative attaching mechanisms.

FIG. 8 is a fishing line exchanging device according to an alternate embodiment of the present invention.

FIG. 9 shows the fishing line exchanging of the alternative embodiment of FIG. 8 connected to a fishing reel and rod as a drive mechanism for the fishing reel.

DETAILED DESCRIPTION OF THE PREFERRED EMBODIMENT

Figure 1A:
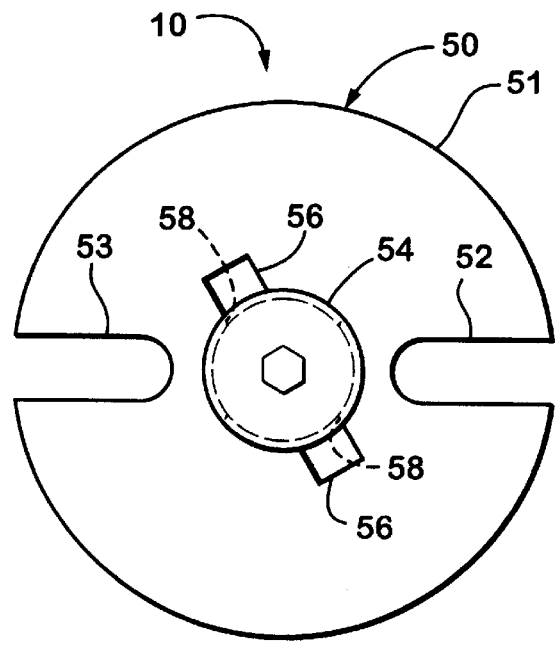
FIG. 1 is a plan view of the drive member and the spool member of the present invention for use according to the method of the present invention.
Figure 1B:
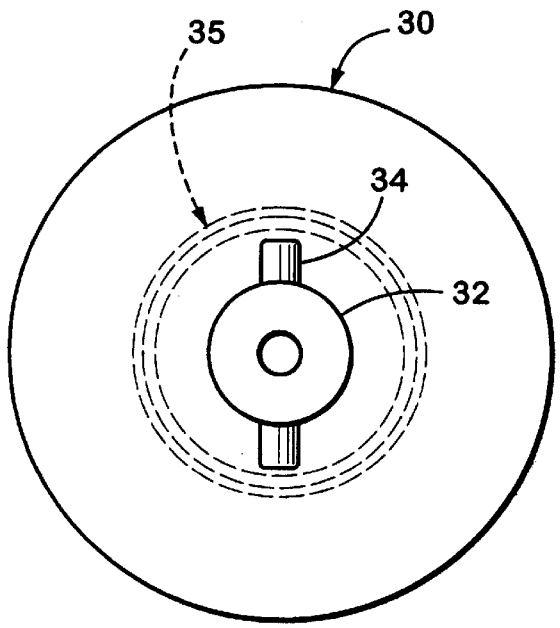
Figure 2:
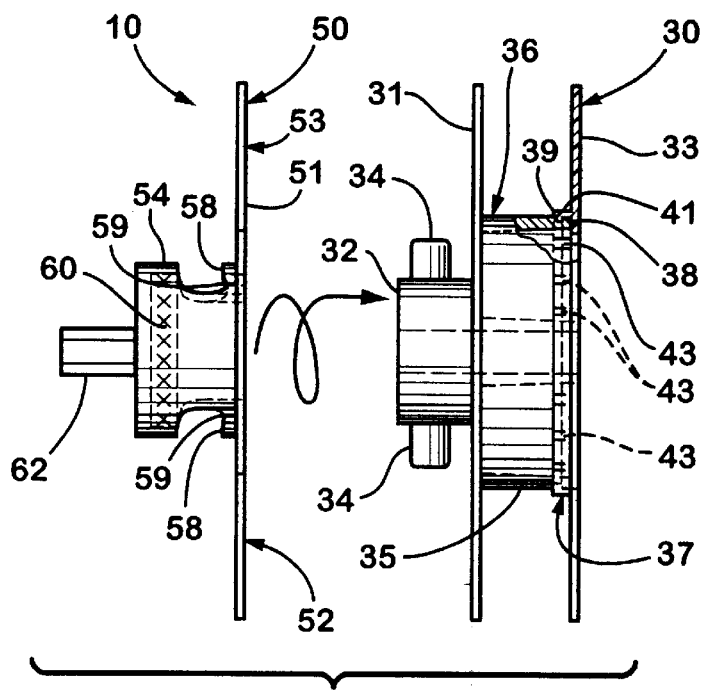
FIG. 2 is a side view of the drive member and the spool member of FIG. 1 of the present invention.
Figure 5:
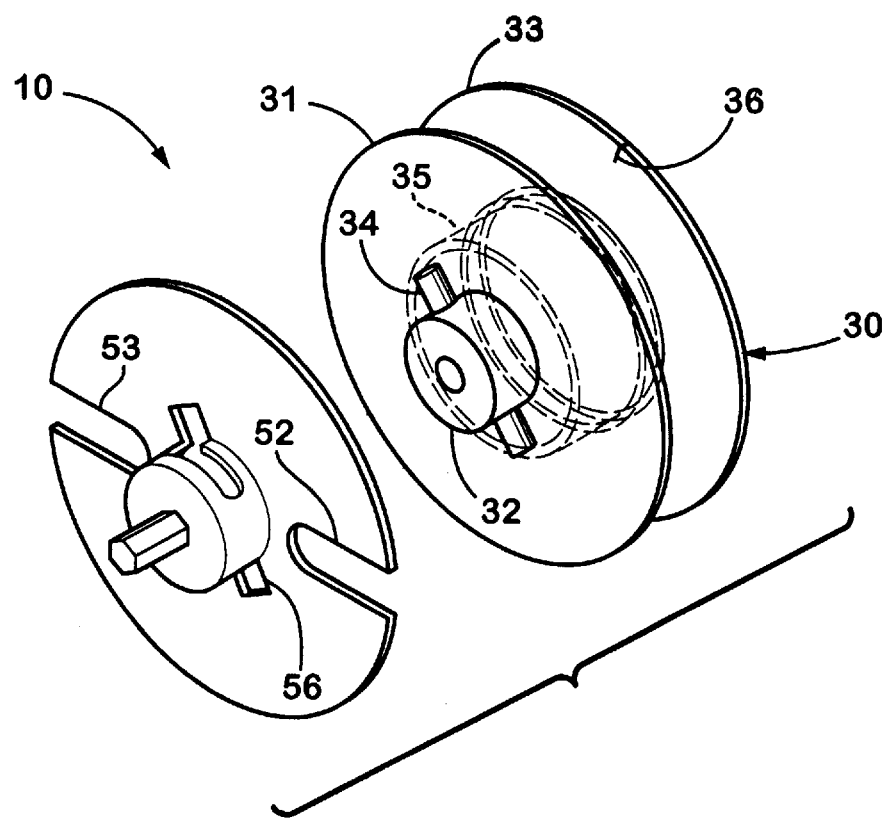
FIG. 5 is a perspective view of a device according to the present invention.

With general reference to FIGS. 1 through 5, and in particular to FIGS. 1 and 2, there is shown a device or tool 10 for exchanging a fishing line of a fishing reel 400 of a fishing rod 410. In the preferred embodiment of FIG. 2, the tool 10 includes a spool 30 and a drive member 50 for connection with the spool 30. The spool 30 includes a first flange 31, a second flange 33 and a cylinder 35. The first flange 31 is integrated or fixedly connected to the cylinder 35 and preferably the first flange 31 is unitarily formed with the cylinder 35. The second flange 33 may also be unitarily formed with the cylinder 35 but preferably the second flange 33 is removably attached to the cylinder 35 through the use of a connection 37.

The connection 37 shown in FIG. 2 includes a first ridge 38 located on the end of the cylinder 35 closest the second flange 33. The second flange 33 includes an inwardly directed cylinder portion 41 having a diameter slightly larger (in FIG. 7A the cylindrical portion 41 is shown as being smaller as an alternative to the connection 37 of the embodiment shown in FIG. 2 which provides for easier spooling of the fishing line) than the diameter of the cylinder 35. A second ridge 39 is provided on the inner side of the cylinder portion 41 and is designed to have an interference fit with the ridge 38 on the cylinder 35. Thus, the second flange 33 is removably attachable to the cylinder 35.

The first and second ridges 38 and 39, respectively and the cylinder 35 and the cylinder portion 41 are sized to provide an interference fit that allows the second flange to be removed from the cylinder 35 using a reasonable amount of force but with enough of an interference fit such that when the tool 10 is used as described herein the flange 33 stays aligned with the cylinder 35. Furthermore, as shown in FIG. 2, the connection 37 can be provided with a plurality of indexing stops 43 between the cylinder portion 41 and the cylinder 35. The stops 43 are aligned with the axis of the cylinder 35 and cylinder portion 41 such that the stops 43, located on both the cylinder 35 and the cylinder portion 41 will contact one another and prevent rotation of the second flange 33 with respect to the cylinder 35.

It is also possible to use other types of connections 37 for removably connecting the second flange 33 to the cylinder 35. Such other types of connections 37 would include, but should not be limited to a taper-lock interference fit, any type of bayonet lock, any type of hole and pin, any type of thread or cammed surface, any type of hook and loop fastener or any other type of connection that would be apparent to a person of ordinary skill in the art. For example, FIGS. 7A through 7C show other types of connecting structures for connecting the second flange 33 to the cylinder 35 of a tool 10. It should be appreciated by a person of ordinary skill in the art that only the relevant portion of the tool 10 is shown in FIG. 7 to detail the connection 37. Additionally, it should also be understood that any other type of connecting structure can be used that would function equivalent to the disclosed structures.

FIG. 7A is nearly identical to the embodiment in FIGS. 1 and 2, except that the cylinder 35 is now on the outside of cylinder portion 41 such that the connection 37 is essentially reversed. Alternatively, FIG. 7B shows that the cylinder portion 41 can be threaded onto the cylinder 35 using a pair of mating threads 46. The threads 46 are preferably designed to have a tight interference fit such that the cylinder portion 41 will not easily rotate off during use of the tool 10. The alternative connections 37 shown in FIGS. 7A and 7B are advantageous because they allow for the side opposite the first flange 31 of the cylinder 35 to be located next to the inside of the second flange 33. Thus the fishing line being wound or unwound from the spool 30 will not be caught in the connection 37.

FIG. 7C shows yet another alternative connection method for connecting the first flange 31 and cylinder 35 to the second flange 33 using a plurality of tongues 71 and grooves 72 located along the peripheral edges of the cylinder 35 and cylinder portion 41, respectively. It should be understood that any conventional tongue 71 and groove 72 combination and locations could be used for forming the connection 37 in the embodiment shown in FIG. 7C.

Similarly, it is possible to use the same connection 37 to connect the first flange 31 to the cylinder 35 as also discussed above. While it is technically not necessary since the flange 33 can be removed, the first flange 31 can be removed and replaced as desired.

The spool 30 is also provided with a cylindrical extension 32 located proximate the first flange 31 and extending in a direction away from the second flange 33. The cylindrical extension 32 has a pair of radially extending locking members 34, the members 34 being located opposite one another along the periphery of the cylindrical extension 32 for connecting the spool 30 with the drive member 50.

The drive member 50 includes a generally disc-shaped member 51 having first and second slots 52 and 53, respectively, for engaging the knobs of a handle of a fishing reel as described below. The drive member 50 is designed to be removably connected with the spool 30. The drive member includes a cylindrical extension 54 having a diameter greater than the diameter of the cylindrical extension 32 of the spool 30. The drive member 50 further includes a pair of holes 56 aligned with the cylindrical extension 54 and aligned with the extending locking members 34 of the spool 30 such that each extending locking member 34 aligns with a hole 56 in the drive member 50. Cammed passages 58 are in communication with each hole 56 and are located on the back side of the disc-shaped member 51 and in the wall of the cylindrical extension 54 such that when the cylindrical extension 32 is inserted within the cylindrical extension 54 of the drive member, each locking member 34 is received within a respective hole 56 and a respective passage 58. Each passage 58 includes a dwell 59 as further described below.

The drive member 50 further includes a biasing member 60 which is shown as being a soft resilient, spongy material located within the end of the cylindrical extension 54. The biasing member 60 contacts the cylindrical extension 32 once it is placed within the cylindrical extension 54 and biases the spool 30 to lock the locking members in the dwells 59 of the passages 58 such that the drive member is rotationally and axially locked with the spool 32. It would be simple and easy to replace the soft spongy material with a spring or biasing member or any other similar and equivalent known structure that would serve to lock the locking members in the dwells 59. While the present connection of locking the spool 30 with the drive member 50 is a bayonet-type lock, it should be appreciated by a person of ordinary skill in the art that other types of connections can be used provided they lock the spool 30 and drive member 50 together and prevent axial rotation with respect thereto.

The fishing line is attached to the tool 10 in any conventional manner. Preferably, the fishing line is attached to the spool 30 using an anchor 36. Then anchor 36 is simply a small piece of notched material typically in a "V" shaped cut. A portion of the fishing line is trapped in the anchor 36 on the spool 30 and then the fishing line can be wound around the spool 30. It should be understood that any conventional means can be used to attach the fishing line to the spool 30 including tying a knot (not shown) in the fishing line around the spool 30. Furthermore, it is possible to locate the anchor 36 in any part of the spool 30 including either flange 31 or 33 similar to a spool of thread.

The drive member 50 is also provided with a hexagonal shaped bit 62 connected to the cylindrical extension 54 and aligned with the axis of the cylindrical extension 54. The bit 62 is designed to connect the drive member 50 and thus the spool 30 with a motor or drill 80 as shown in FIG. 3 for automated rotation of the spool 30.

Figure 6:
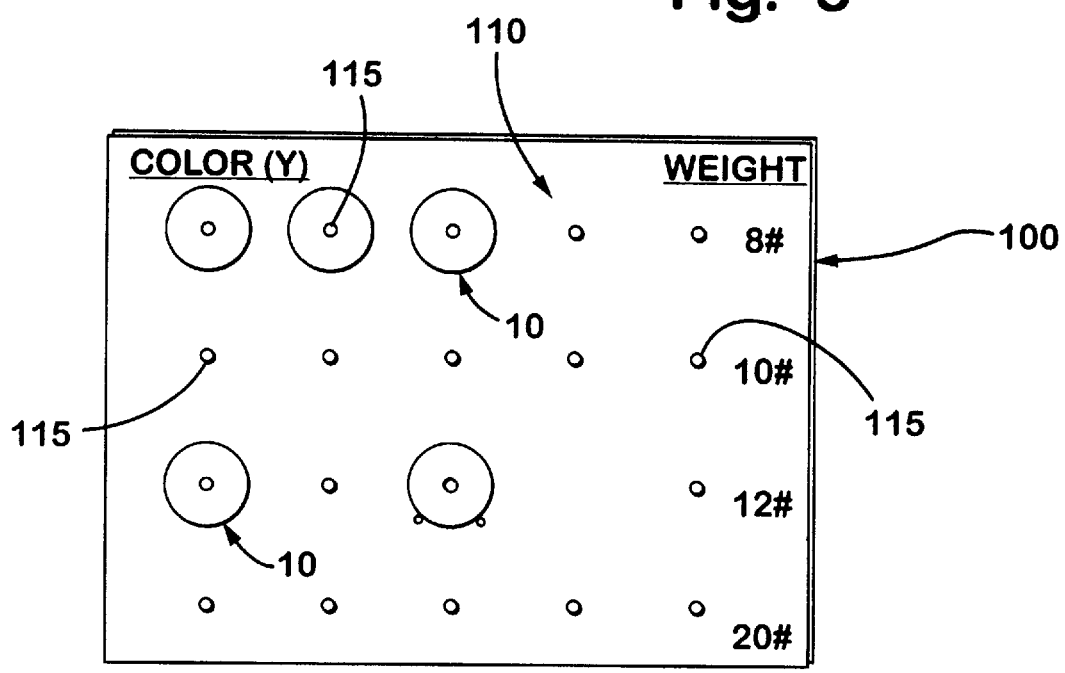
FIG. 6 is a perspective view of a storage rack for storing a multitude of fishing line exchanging devices pursuant to the method according to the present invention.

FIG. 6 shows a storage rack 100 generally including an array 110 of storage pegs 115 wherein each peg 115 of the array 110 is designed to receive a respective fishing line exchanging tool 10 according to the present invention. A multitude of tools 10 can be stored on the storage rack 100 in an organized array 110 having a first axis (X) for the strength or weight of the fishing line and a second axis (Y) for the color of the fishing line as best shown in FIG. 6. Additional segmentation of the array can include partitions for the condition of the fishing line on the particular tool 10, i.e., such as old or new, or any other classification as might be preferred by the angler.

The storage rack 100 is used as part of the method of the present invention in which an empty first tool 10 is retrieved from the storage rack 100 and used to remove a fishing line from a reel as described above. Once the fishing line is removed onto the first tool 10, the first tool 10 is positioned on the storage rack 100, preferably according to the classification of the rack 100 or alternatively the fishing line is removed from the tool 10 as described above and discarded. It should be understood by a person skilled in the art that the above steps can change as necessary but are logically related.

Next, a second tool 10 having a fishing line of a desired weight and color is selected from the storage rack 100. The fishing line of the second tool 10 is then installed on the reel as described above according to the method of the present invention. Once the fishing line of the second tool 10 is installed, the second tool 10 is returned to the storage rack 100 as an empty tool 10 for future use. Accordingly, the present method of using the storage rack and the method of exchanging the fishing line of the present invention can be repeated as desired.

In a further alternative embodiment of the present invention, FIGS. 8 and 9 show a fishing line exchanging tool or driving member 210 comprised of a substantially "H"-shaped member 220 having a first slot 221 and a second slot 222 for alignment with a handle 420 of a fishing reel 400 connected to a fishing rod 410. The driving member 210 further includes a drive bit 215 connected at the middle of the "H" shaped tool 210. The drive bit 215 is preferably hexagonal in shape but may have any number of sides and/or shapes such that it is still operable to transfer a driving force being added to the drive bit 215 into rotational motion of the tool 210 to drive the reel 400 as described below.

The handle 420 includes a first knob 421 and a second knob 422 interconnected by a plate 423, wherein the handle 420 is connected at approximately a middle point of the plate 423 to a shaft (not shown) which is connected to the gears (not shown) of the reel 400. The driving member 210 is positioned to engage the handle 420 of the reel 400 such that the first slot 221 contains the first knob 421 and the second slot 222 contains the second knob 422. With the knobs 421 and 422 located in the slots 221 and 222, respectively, a torque can be applied to the drive bit 215 (in an appropriate direction) to drive the handle 420 of the reel 400 to take up the fishing line 430. Preferably, the torque applied to the drive bit 215 is supplied by a motorized device such as a drill or cordless screwdriver of any known or conventional type.

While the invention has been described in terms of a preferred embodiment, it should be apparent that other forms could be easily adopted by one skilled in the art. Accordingly, the scope of the present invention is to be limited only by the following claims.

What is claimed is:

1. An apparatus for exchanging a fishing line of a fishing reel, said apparatus comprising:
    a) a spool having a first flange, a second flange and a central cylinder located between said first and said second flanges for receiving a fishing line; and
    b) wherein said spool further includes a means for driving said fishing reel.

2. An apparatus according to claim 1 wherein said fishing reel further includes a handle having a first knob and a second knob and wherein said driving means comprises said spool having a pair of openings in said first flange for engagement with said first and second knobs of said handle of said fishing reel.

3. An apparatus according to claim 1 wherein said spool further includes an anchor on said spool for attaching said fishing line to said apparatus.

4. An apparatus according to claim 1 further comprising a drive bit connected to said second flange of said spool, said drive bit for connecting said spool to a motor.

5. An apparatus according to claim 2 further comprising a drive bit connected to said second flange of said spool, said drive bit for connecting said spool to a motor.

6. An apparatus according to claim 1 further comprising:
    a) a drive member for connection to said second flange of said spool, said driving means comprising said drive member; and
    b) means for removably attaching said spool to said drive member.

7. An apparatus according to claim 6 wherein said removable attaching means comprises centrally located bayonet-type, male, locking device connected to said second flange of said spool and said drive member includes a bayonet-type, female, locking device for connection to the male part on said spool, said drive member further including a tool bit connection on a side opposite said bayonet-type, female, locking member such that the spool is removably attachable with the drive member and can be driven by said tool bit.

8. An apparatus according to claim 1 wherein said reel has a handle having a first knob and a second knob and further wherein said driving means comprises a substantially flat disc-shaped member, said flat, disc-shaped member having a first and a second hole for alignment with a first and a second knob, respectively, of said handle of said reel.

9. An apparatus according to claim 1 wherein said first flange of said spool is removably connected with said central cylinder and said second flange is unitarily formed with said central cylinder.

10. A method of operating an apparatus for changing the fishing line of a fishing reel, said method comprising the steps of:
    a) providing said apparatus having a spool having a first flange, a second flange and a central cylinder located between said first and said second flanges for receiving a fishing line; and wherein said spool further includes a means for driving the handle of the reel;
    b) attaching a free end of the fishing line of said fishing reel to said spool and rotating said spool to remove said fishing line from said reel; and
    c) selecting a second spool having a first flange, a second flange and a central cylinder located between said first and said second flanges having said second fishing line wound thereon and wherein said second spool further includes a means for driving the handle of the reel; said second spool is connected to said handle of said reel and is driven to install said second line on said reel.

11. An apparatus for exchanging a fishing line of a fishing reel, said apparatus comprising:
    a) a spool having a first flange, a second flange and a central cylinder located between said first and said second flanges for receiving a fishing line;
    b) wherein said spool further includes a disc-shaped driver for driving said fishing reel to remove fishing line from said fishing reel and to add fishing line to said fishing reel, said disc-shaped driver being connected to said spool.

12. The apparatus according to claim 11 further comprising a means for connecting said second flange to said cylinder of said spool, said connecting means located between said second flange and said cylinder.

13. The apparatus according to claim 12 wherein said connecting means comprises a threaded connection having a first thread on said cylinder and a second complimentary thread located on a cylinder portion in said second flange.

14. The apparatus according to claim 12 wherein said connecting means comprises a tongue and groove connection wherein a tongue defines a portion of one of said cylinder and said second flange and a groove forms a portion of the other of said cylinder and said second flange and said tongue and groove are aligned for said tongue to insert in said groove to connect said second flange to said cylinder.

15. The apparatus according to claim 12 wherein said connecting means comprises an interference fit between said cylinder of said spool and a cylinder portion of said second flange.

16. An apparatus for exchanging a fishing line of a fishing reel, said apparatus comprising:
    a) a spool having a first flange, a second flange and a central cylinder located between said first and said second flanges for receiving a fishing fine; and
    b) a drive member connected to said spool, said drive member having a means for driving said spool and said fishing reel to remove an old fishing line located on the fishing reel and to take up a new fishing line on the fishing reel.

17. An apparatus for exchanging a fishing fine of a fishing reel having a handle having a first knob and a second knob, said apparatus comprising:
    a) a substantially H-shaped drive member having a first slot for receiving said first knob and a second slot substantially opposite said first slot, said second slot for receiving said second knob; and
    b) a drive bit connected to said H-shaped drive member at a point located between said first slot and said second slot.

18. The apparatus according to claim 17 wherein said drive bit has a hexagonal cross section.

* * * * *